(12) United States Patent
Mondal et al.

(10) Patent No.: US 8,194,762 B2
(45) Date of Patent: Jun. 5, 2012

(54) FEEDFORWARD OF NON-QUANTIZED PRECODING WEIGHTS IN A WIRELESS COMMUNICATIONS SYSTEM

(75) Inventors: Bishwarup Mondal, Schaumburg, IL (US); Amitabha Ghosh, Buffalo Grove, IL (US); Fan Wang, Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 960 days.

(21) Appl. No.: 12/193,820

(22) Filed: Aug. 19, 2008

(65) Prior Publication Data

US 2010/0046643 A1    Feb. 25, 2010

(51) Int. Cl.
    *H04K 1/10* (2006.01)
(52) U.S. Cl. ........ 375/260; 375/267; 375/263; 375/264; 375/299; 455/500; 455/69; 455/512; 455/524; 455/59; 455/517; 455/526; 455/101; 455/103; 455/105
(58) Field of Classification Search .................. 375/260, 375/267, 263, 264, 299; 455/500, 69, 512, 455/524, 59, 517, 526, 101, 103, 105
    See application file for complete search history.

(56) References Cited

U.S. PATENT DOCUMENTS

| | | | |
|---|---|---|---|
| 6,611,675 B1 | 8/2003 | Salonen et al. | |
| 2006/0094435 A1* | 5/2006 | Thomas et al. | 455/450 |
| 2007/0254602 A1* | 11/2007 | Li et al. | 455/88 |
| 2007/0281624 A1* | 12/2007 | Thomas et al. | 455/67.11 |
| 2009/0046570 A1* | 2/2009 | Sarkar et al. | 370/203 |
| 2009/0046800 A1* | 2/2009 | Xu et al. | 375/267 |
| 2009/0232239 A1* | 9/2009 | Ko et al. | 375/260 |
| 2009/0238303 A1* | 9/2009 | Mondal et al. | 375/295 |

OTHER PUBLICATIONS

Thomas, et al., "Obtaining Channel Knowledge for Closed-Loop Multi-Stream Broadband MIMO-OFDM Communications Using Direct Channel Feedback," Global Telecommunications Conference, 2005, GLOBECOM '05, IEEE, vol. 6, Nov. 28-Dec. 2, 2005, pp. 3907-3911.
Chae, et al., "Coordinated Beamforming for Multiuser MIMO Systems with Limited Feedforward," Fortieth Asilomar Conference on Signals, Systems and Computers, 2006, ACSSC '06, Oct.-Nov. 2006, pp. 1511-1515.

* cited by examiner

*Primary Examiner* — David Ometz
*Assistant Examiner* — Rahel Guarino

(57) ABSTRACT

An apparatus and method to feedforward non-quantized precoding weights in an OFDM communication system includes a first step (300) of sending feedback information from a subscriber station (SS) to a base station (BS). A next step (302) includes deriving non-quantized weight information from the feedback information. A next step (304) includes transmitting symbols carrying the non-quantized weight information and non-precoded pilot symbols by the BS. A next step (305) includes receiving the information and symbols by the SS. A next step (306) includes estimating the non-quantized weights from the symbols carrying the non-quantized weight information and the non-precoded pilot symbols by the SS. A next step (308) includes decoding data from the BS by the SS using the estimated non-quantized weight information.

14 Claims, 3 Drawing Sheets

FEEDFORWARD OF NON-QUANTIZED PRECODING WEIGHTS IN A WIRELESS COMMUNICATIONS SYSTEM

FIELD OF THE INVENTION

This invention relates to wireless communication systems, and in particular, to a mechanism for providing precoding weights in a communication system.

BACKGROUND OF THE INVENTION

In mobile broadband cellular communication systems, there are several physical layer techniques that require a transmitter to be provided with knowledge of the channel response between the transmitter and a receiver. Transmission techniques that make use of the channel response between the transmitter and receiver are called closed-loop transmission techniques. One example of closed-loop transmission is the use of transmit precoding at the transmitter. An antenna array employing transmit precoding comprises of an array of multiple transmit antennas where the signals fed to each antenna are weighted in such a way as to control the characteristics of the transmitted signal energy according to some pre-defined optimization strategy.

Generally, the transmitted antenna signals are weighted based on knowledge of the space-frequency channel response between each transmit antenna and each receive antenna and attempts to optimize the characteristics of the received signal processed by the receiving device.

In general, there are different techniques for providing a transmitter with knowledge of the channel between each transmit antenna and each receive antenna. The methods described henceforth are applicable to any multiple-antenna equipped wireless transmitter and a receiver. However, for the sake of clarity, this discussion is focused at the downlink of a cellular system where the base station (BS) is the transmitter and a mobile station or subscriber station (SS) is the receiver.

One technique is based on feedback messages from the SS, where the SS measures the channel response between the BS antennas and the SS antennas and transmits a feedback message back to the BS containing enough information that enables the BS to perform closed loop transmit precoding. This technique relies on digital signaling that includes codebook based quantization at the SS and encoding the precoding matrix index as a feedback message.

Another technique is based on the reciprocity of the RF channel response. An RF propagation channel may be treated as reciprocal (by virtue of antenna calibration), which means the downlink RF channel matrix (where the matrix refers to the channel gains between each transmit and receive antenna) at a given time-frequency point is simply the matrix transpose of the uplink RF channel matrix at the same time-frequency point. In a TDD system, a downlink channel response can sometimes be derived from an uplink data transmission. Along the same lines, in an FDD system some direction-of-arrival (DOA) based methods may be used to derive spatial properties of a downlink channel from uplink transmission.

Another technique is to feedback analog channel information measured by the SS via an uplink channel. This analog channel information may include spatial covariance matrix coefficients, channel coefficients, precoding matrix coefficients.

Accordingly, what is needed is a technique to feedforward precoding information from a BS such that the SS can reconstruct the downlink channel response, properly decode data, and perform closed loop reception. It would also be of benefit to provide a technique that does not rely on digital signaling. It would be of further benefit to provide a technique that does not rely on sounding based on beamformed pilot signals.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Figure 1:
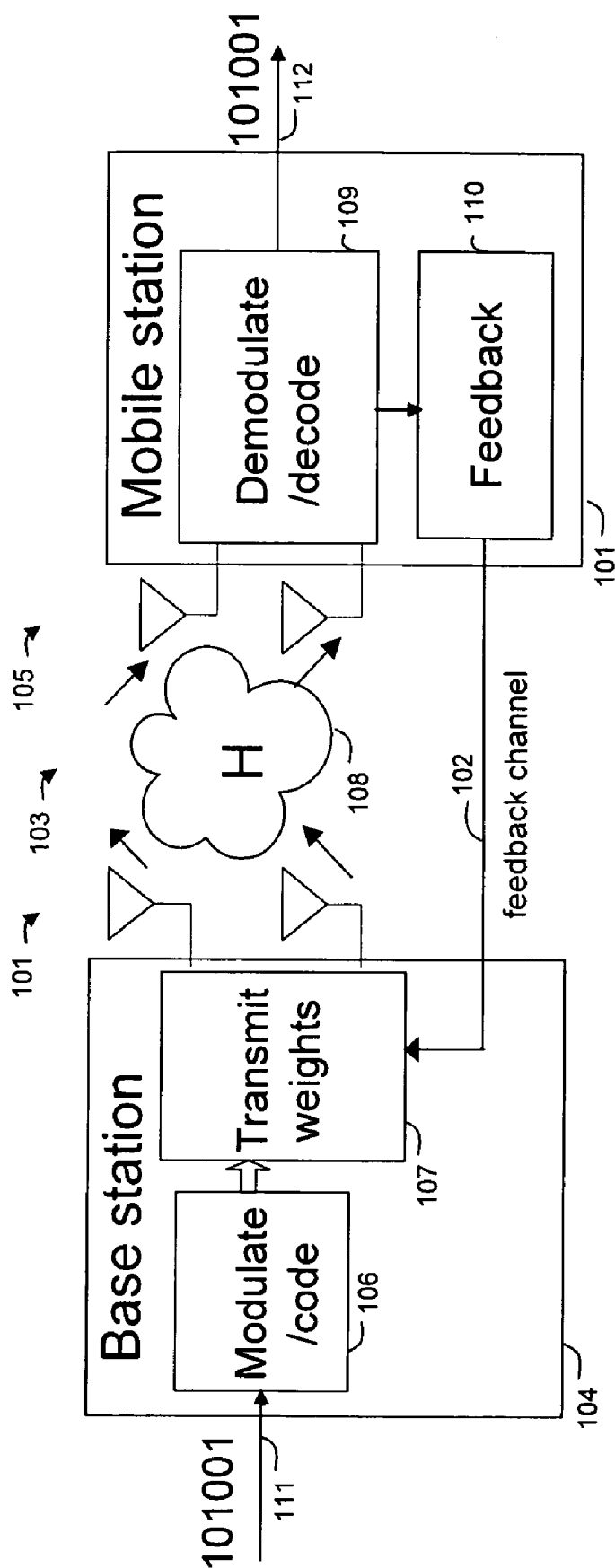
FIG. 1 shows a block diagram of a system, in accordance with the present invention.

Skilled artisans will appreciate that common but well-understood elements that are useful or necessary in a commercially feasible embodiment are typically not depicted or described in order to facilitate a less obstructed view of these various embodiments of the present invention.

DESCRIPTION OF THE PREFERRED EMBODIMENTS

The present invention provides a feedforward technique to supply non-quantized precoding weight information to an SS such that the SS can reconstruct the downlink channel response and perform closed loop reception. In addition, the present invention provides a technique to enable sounding or analog feedback with non-precoded pilot symbols. It also enables a base station to employ non-quantized precoding derived from codebook based precoding matrix index feedback from multiple SSs. This is particularly useful for downlink transmission to multiple SSs in the same time and frequency utilizing techniques such as zero-forcing.

Specifically, the present invention enables a base station to derive a set of precoding weights for each SS, in part, from the feedback information received from multiple SSs. The form of feedback could be based on a sounding waveform, analog feedback (channel covariance coefficients, channel coefficients or precoding matrix coefficients) or codebook-based index feedback. Then a subset of these precoding weights is transmitted to each SS on the downlink in a non-quantized form. The weights signaled to each SS may correspond to different ranks or different users (for downlink multi-user multiple-input-multiple-output (DL MU-MIMO)) or both. The signaling of the non-quantized weights to the mobile receiver is explicit, which means that the prior art technique of using beamformed (BF) pilot symbols intended for channel estimation (for decoding of data) is not considered part of the present invention. Instead non-precoded, non-beamformed (and/or broadcast) pilot symbols are necessarily used along with the non-quantized weight bearing symbols to convey the non-quantized weights to the SS. The non-quantized precoding weights are then derived at the SS by using the non-precoded pilots and the analog weight bearing symbols.

In one embodiment of the present invention, the symbols carrying analog weight information can be thought of as BF-pilot symbols since they are beamformed. However, the difference from the prior art is the following; a) the non-quantized weights must be accompanied by non-BF pilot symbols (even though BF-pilot symbols may or may not be accompanied by the non-BF pilot symbols), b) the non-quantized weights are explicitly estimated at the SS using non-BF pilot symbols and the non-quantized weight bearing symbols (i.e. BF-pilot symbols need not be used to derive non-quantized weight information at the SS), and c) the non-quantized weight bearing symbols need not be co-located (close in terms of time-frequency location) with the downlink payload data allocation (whereas BF pilots are necessarily co-located with the data allocation in the prior art).

FIG. 1 shows a block diagram of communication system, in accordance with the present invention. The communication system can include a plurality of cells (only one represented) each having a base station (BS) 104 in communication with one or more subscriber stations (SSs) 101. If closed loop transmission is to be performed on the downlink 103 to SS 101, the BS 104 can be referred to as a source communication unit, and the SS 101 can be referred to as a target communication unit. In the preferred embodiment of the present invention, communication system 100 utilizes an Orthogonal Frequency Division Multiplexed (OFDM) or multicarrier based architecture including Adaptive Modulation and Coding (AMC). The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In addition, in alternate embodiments the communication system 100 may utilize other cellular communication system protocols such as, but not limited to, TDMA, direct sequence CDMA (DS-CDMA), and the like.

The BS 104 includes a transmit antenna array 101 communicating a data stream to a SS 101 having one or more receive antennas 105 (e.g., a MIMO system). The input data-stream 111 is modulated and coded 106 and then multiplied by transmit weights 107 before being fed to the multiple transmit antennas 101. Multiplying the input data-stream 111 by transmit weights 107, where the transmit weights are based on at least a partial channel response, is one example of tailoring a spatial characteristic of the transmission. The signals transmitted from the multiple transmit antennas 101 propagate through a matrix channel 108 and are received by one or more receive antennas 105. The signals received on one or more receive antennas 105 are demodulated and decoded 109 to produce the output data-symbol stream 112.

In accordance with the present invention, at least one SS 101 performs feedback measurements 110 based on the channel 108 and provides these measurements through an uplink feedback channel 102 to the BS 104. The feedback may include sounding waveform, analog feedback (channel covariance coefficients, channel coefficients or precoding matrix coefficients) or codebook-based precoding matrix index feedback. The BS 104 can then derive the transmit weights 107 accordingly to improve the downlink reception by the SS. The Base Station 104 then operates to feed forward a non-quantized weight to at least one SS 101. The present invention allows the use of common (non-beamformed) pilots on the downlink with a precoded downlink MIMO data transmission (with a non-quantized precoder). The non-quantized precoding weight may be carried by some special symbols in the downlink in conjunction with the non-beamformed pilot symbols. At least one SS 101 can then estimate the non-quantized precoding weights carried by the special symbols by using the common (non-beamformed) pilots, and can then decode data from the BS 104 using the estimated weights.

A novel aspect of the present invention is providing non-quantized weight information that is precoded into at least one special set of symbols that is multiplexed both in time and frequency with non-beamforming pilot signals. Considering that the special set of symbols and the non-beamforming pilot symbols occur within the same time-frequency space, the non-beamforming pilots will experience similar channel conditions and can be used to estimate the non-quantized weight information in a manner which is distinct from using beamformed pilot signals.

Figure 2:
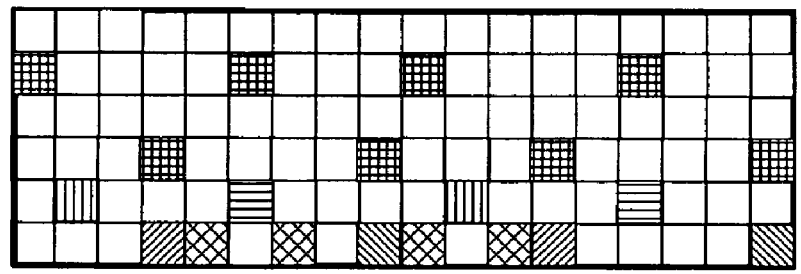
FIG. 2 shows a graphical illustration of two formats of the feedforward information, in accordance with the present invention.
Figure 2:
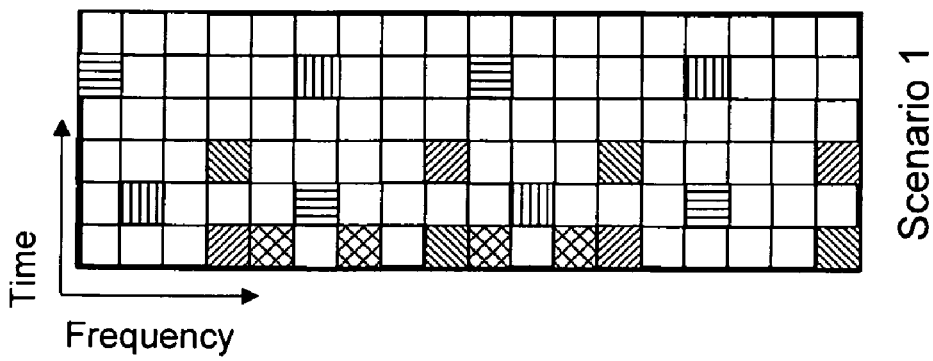

FIG. 2 shows a diagram of two sample downlink subframes of a BS 104 in a TDD system or an FDD system, and in particular illustrates the physical location for the proposed feedforward symbols carrying non-quantized weight information of the present invention. The downlink frame is mapped with resource tiles of size eighteen subcarriers by six OFDM symbols. To signal the presence, location and characteristics of the feedforward symbols carrying non-quantized weight information, a special information element (IE) may be transmitted by the BS in a control channel to one or more served SS. For the purpose of explanation, this IE contains the information that specifies exactly where the feedforward symbols are located in time and frequency.

The allocated feedforward symbols carrying non-quantized precoding weights can be in any time-frequency portion of the downlink frame. However, they should be multiplexed between, and in close proximity to, non-beamforming pilot signals.

Two scenarios are shown in FIG. 2. In the first scenario, only non-beamforming pilots are shown in the downlink. In this scenario, the non-quantized weights are estimated using the non-BF pilots, and the payload data is subsequently decoded using the non-BF pilots and the estimated weights. In the second scenario, non-beamforming pilots and beamforming pilots co-exist in the same downlink subframe. However, the non-quantized weights are again estimated using non-BF pilots, and the payload data is subsequently decoded using the non-BF pilots and/or the BF pilots and/or the estimated weights. In both cases, the non-quantized precoding weight symbols are multiplexed between, and in close proximity to, non-beamforming pilot symbols.

In a preferred embodiment for an IEEE 802.16-like system, the non-quantized weight carrying symbols are assigned subcarriers that are close together in time and frequency as shown. The signaling parameters of the OFDMA mode of the IEEE 802.16 air interface standard are used to provide a detailed example, but the invention is not limited to this particular example. Of course, it should be recognized that the non-quantized weight carrying symbols (or the feedforward symbols) may be distributed in any pattern as long as they are in close proximity to non-beamforming pilots. In addition, different DL frame formats could be used for different base stations, wherein the different subframes may have the same or a different pattern of analog weight tiles.

Figure 3:
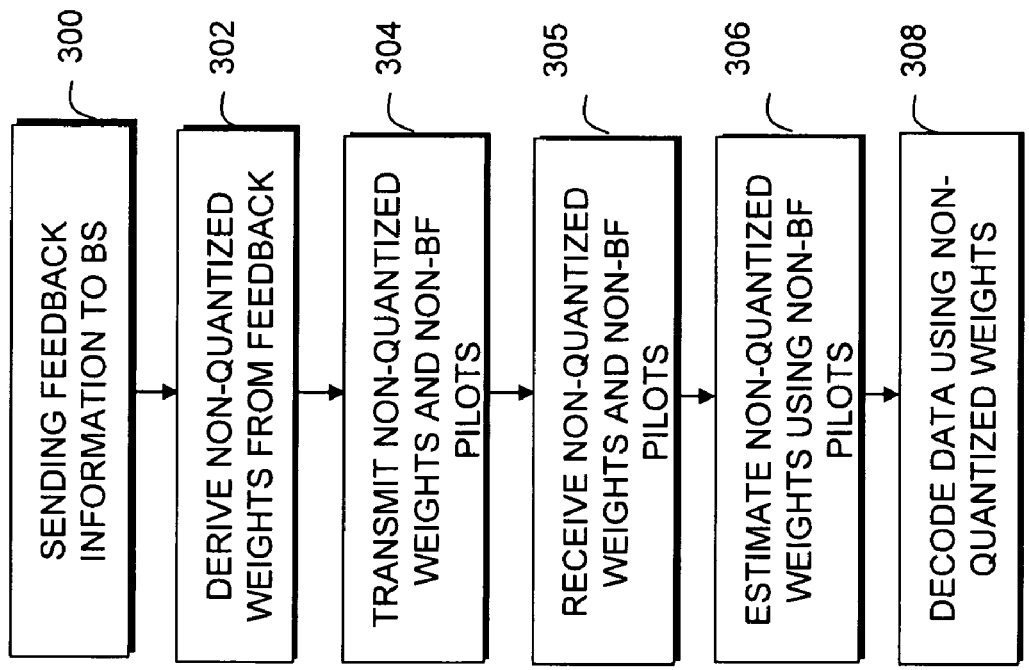
FIG. 3 shows a flow chart illustrating a method, in accordance with the present invention.

FIG. 3 shows a flowchart that illustrates a method to feedforward non-quantized weights in an OFDM communication system, in accordance with the present invention.

A first step 300 includes sending feedback information from at least one receiver (i.e. subscriber station) to a transmitter (i.e. base station). This step can include constructing a sounding waveform with pilot symbols. The feedback information of this step can be a sounding waveform, analog weights, or codebook based indices calculated by the SS and describing channel conditions. Specifically, the sounding waveform can include pilot symbols and analog channel information including covariance matrix coefficients, channel coefficients, and analog precoding weights.

A next step 302 includes deriving non-quantized weight information, in part, from the feedback information from at least one SS to be used as transmit weights by the BS. The non-quantized weight information may comprise a set of precoding weight matrices for the SSs being served by the BS. This step can also include deriving analog weights at the transmitter from received pilot symbols, control data symbols, and data traffic symbols from one or more receivers (SSs). This step can also include deriving non-quantized weights at the transmitter from the received codebook-based precoding matrix index feedback from one or more receiver (SSs).

A next step 304 includes transmitting (feeding forward) symbols carrying a subset of the non-quantized weight information and non-beamformed pilot symbols by a transmitter (i.e. the base station) to at least one receiver (i.e. subscriber station). Preferably, the symbols carrying the non-quantized precoding weight information are located in subcarriers that are multiplexed between, and in proximity to, the non-beamforming, non-precoded pilot symbols.

A next step 305 includes receiving the non-quantized weight information and non-beamformed pilot symbols by at least one receiver (subscriber station).

A next step 306 includes estimating non-quantized weights from the symbols carrying the non-quantized weight information and the non-precoded, non-beamformed pilot symbols by at least one subscriber station. This can be accomplished by estimating the channel on the subcarriers carrying the non-quantized weight information from the received non-beamformed, non-precoded pilot symbols.

A next step 308 includes decoding data transmitted from the base station by at least one subscriber station using the estimated non-quantized weight information.

Although the present invention has been described in terms of the BS feeding forward non-quantized weight information to a SS, it should be noted that the present invention is also operable in the reverse case, wherein the roles of the BS and SS are reversed, and the SS is operable to feedforward non-quantized weight information to a BS.

Advantageously, the present invention enables the usage of sounding-based feedback for SU-MIMO (single-user MIMO) and MU-MIMO (multi-user MIMO) with non-beamformed (and/or broadcast) pilot symbols. The concept can be readily used in any other multiple-antenna system using sounding and non-beamformed pilots (for both single-user as well as multi-user), such as Long Term Evolution (LTE) plus.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method to feedforward non-quantized weights in an OFDM communication system, the method comprising the step of:

transmitting symbols carrying non-quantized weight information and non-precoded pilot symbols by a transmitter to at least one receiver;

receiving the symbols carrying non-quantized weight information and the non-precoded pilot symbols by the at least one receiver; and estimating a non-quantized weights from the received symbols carrying the non-quantized weight information and the received non-precoded pilot symbols by the at least one receiver;

wherein the transmitting step includes the symbols carrying the non-quantized weight information being in subcarriers that are multiplexed between and in proximity to the non-precoded pilot symbols.

2. The method of claim 1, further comprising an initial step of: constructing a sounding waveform with pilot symbols; and sending the sounding waveform from at least one receiver to a transmitter.

3. The method of claim 1, further comprising an initial step of sending analog channel information including covariance matrix coefficients, channel coefficients, analog precoding weights describing channel conditions from at least one receiver to the transmitter.

4. The method of claim 3 further comprising the step of deriving non-quantized weights at the transmitter from the feedback information.

5. The method of claim 1 wherein the transmitting step includes deriving analog weights at the transmitter from received pilot symbols, control data symbols, and data traffic symbols from one or more receivers.

6. The method of claim 1 wherein the transmitting step includes deriving non-quantized weights at the transmitter from received codebook index feedback from one or more receivers.

7. The method of claim 1 wherein the estimating step includes estimating the channel on the subcarriers carrying the non-quantized weight information from the received non-precoded pilot symbols.

8. The method of claim 1 further comprising the step of at least one subscriber station decoding data from a base station using the estimated non-quantized weights.

9. A method to feedforward non-quantized weights in an OFDM communication system, the method comprising the step of:

sending feedback information from at least one subscriber station to a base station;

deriving non-quantized weights from the received feedback information from at least one subscriber station;

transmitting symbols carrying a non-quantized weight information and non-precoded pilot symbols by the base station to the at least one subscriber station;

receiving the symbols carrying non-quantized weight information and the non-precoded pilot symbols by the at least one subscriber station;

estimating the non-quantized weights from the received symbols carrying the non-quantized weight information and the received non-precoded pilot symbols by the at least one subscriber station; and decoding data by at least one subscriber station using estimated non-quantized weight information;

wherein the transmitting step includes the symbols carrying the non-quantized weight information being in subcarriers located in the time-frequency space that are multiplexed between and in proximity to subcarriers containing the non-precoded pilot symbols.

10. The method of claim 9 wherein the feedback information of the sending step is a sounding waveform comprising pilot symbols.

11. The method of claim 10 wherein the sounding symbols also comprise analog channel information including covariance matrix coefficients, channel coefficients, and analog precoding weights.

12. The method of claim 9 wherein the feedback information of the sending step includes a codebook based precoding matrix index.

13. The method of claim 9 wherein the feedback information of the sending step is analog channel information including covariance matrix coefficients, channel coefficients, and analog precoding weights describing channel conditions.

14. The method of claim 9, wherein the estimating step includes estimating a channel on the subcarriers carrying the non-quantized weight information from the received non-precoded pilot symbols.

\* \* \* \* \*